United States Patent [19]

Coccia

[11] 4,301,928
[45] Nov. 24, 1981

[54] HEAT MONITORING AND TRANSFER ARRANGEMENT FOR SPONGE IRON PELLETS

[75] Inventor: Larry Coccia, Elizabeth, Pa.

[73] Assignee: Pullman Incorporated, Chicago, Ill.

[21] Appl. No.: 85,554

[22] Filed: Oct. 17, 1979

[51] Int. Cl.³ .............................................. B07C 5/00
[52] U.S. Cl. .................................... 209/587; 209/657
[58] Field of Search ....................... 209/577, 587, 657; 250/338-353, 358 R, 359, 495, 504

[56] References Cited

U.S. PATENT DOCUMENTS

| | | | |
|---|---|---|---|
| 3,395,793 | 8/1968 | Thompson | 209/577 |
| 3,675,769 | 7/1972 | Story | 209/577 |
| 4,134,498 | 1/1979 | Jones et al. | 209/587 |
| 4,186,836 | 2/1980 | Wassmen | 209/587 |

FOREIGN PATENT DOCUMENTS 1125740 3/1962 Fed. Rep. of Germany ...... 209/657

Primary Examiner—Allen N. Knowles
Attorney, Agent, or Firm—Paul A. Kerstein

[57] ABSTRACT

A heat monitoring and conveying arrangement for newly manufactured sponge iron pellets which were heated up during manufacture at a direct reduction reactor unit, and are ready for transfer to another unit of the plant. The arrangement includes conveying means for moving the pellets, and infra-red sensors supported within an enclosure positioned over the conveying means. The infra-red sensors are adapted to sense the temperature of the sponge iron pellets, and actuate means for segregating sponge iron pellets when heated to a temperature higher than a predetermined temperature required for further processing of the sponge iron pellets.

14 Claims, 9 Drawing Figures

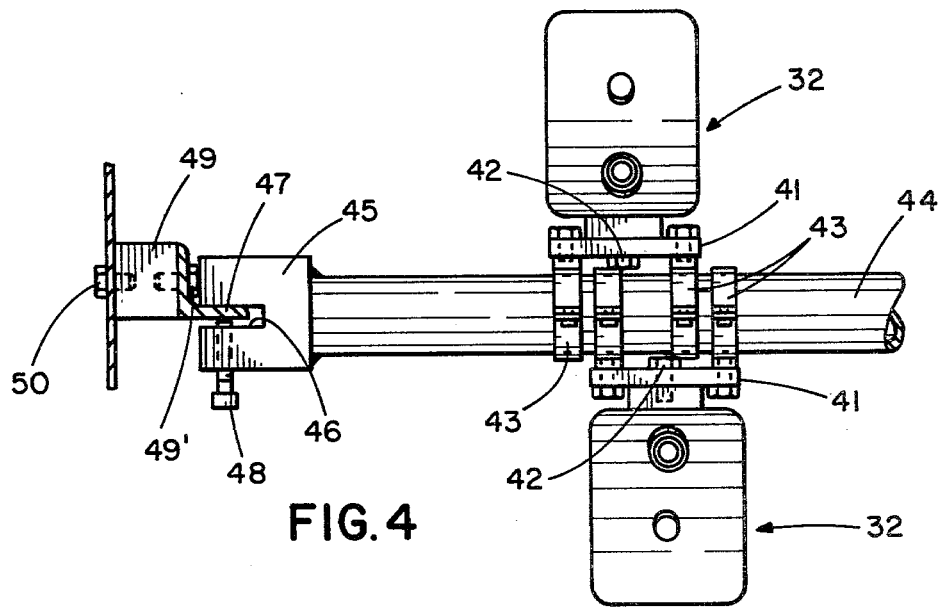
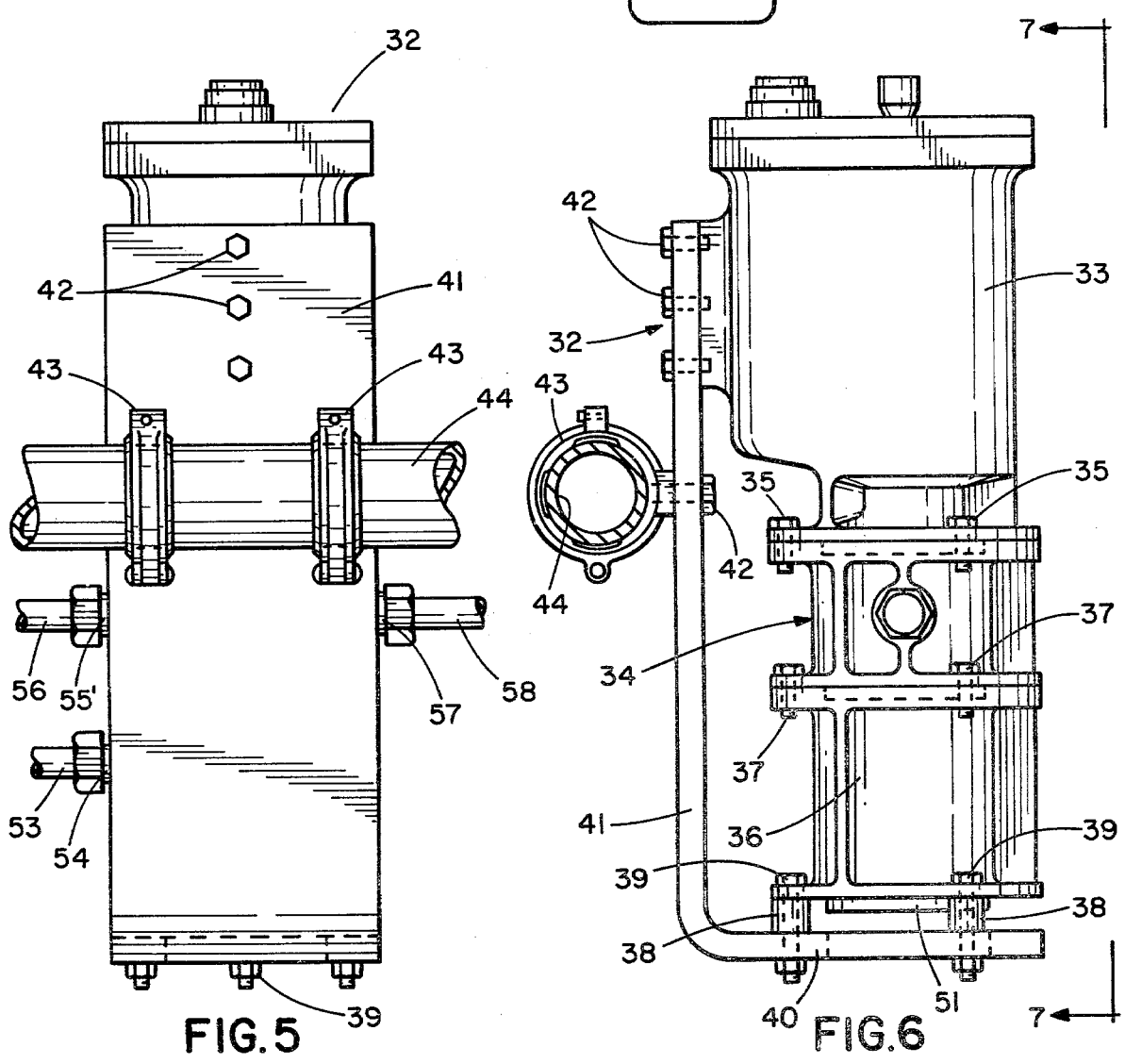

4,301,928

HEAT MONITORING AND TRANSFER ARRANGEMENT FOR SPONGE IRON PELLETS

BACKGROUND OF THE INVENTION

1. Field of the Invention

The present invention relates to the transfer and conveyance of sponge iron pellets after they have been manufactured in a direct reduction reactor unit.

More specifically the invention relates to a sponge iron transfer device which includes heat monitoring devices adapted to segregate different temperature products from each other.

2. Description of the Prior Art

The Taylor U.S. Pat. No. 3,411,005 patented Nov. 12, 1968 utilizes an infra-red detector system which is utilized with a conveyor. However, the present system is particularly unique in that it comprises a means for monitoring the temperature of sponge iron and includes an arrangement responsive to different temperatures of the pellets for segretating good product from bad product.

SUMMARY OF THE INVENTION

The present invention has to do with a transfer or conveyor system which moves sponge iron pellets from a direct reduction reactor unit to another part or unit of the overall plant. Some sponge iron pellets produced in such a reactor have a tendency to continue oxidation for a period of time after it leaves the reactor unit and similar to spontaneous combustion again heats up to a very high temperature. Pellets so heated up above a certain temperature are considered "bad product" and must be segregated from "good product" which then, later is utilized in a smelter in the steel making process.

The conveyor includes at one end a discharge chute arrangement which includes gate valves movable to segregate the bad product and good product into different chutes. The operation of the gates is effected by fluid cylinder and piston rod units which are responsive to effectively segregate the products in response to valves which are actuated by infra-red sensors. The infra-red sensors are mounted in an enclosure which in turn is positioned over the conveyor, the said enclosure having a lower opening. As the product moves with the conveyor, the infra-red sensors detect the temperature and in turn send a signal which will cause the gates to be actuated for segregating the bad product from the good. The temperature differential, of course, determines when the activation of the gate mechanism takes place.

BRIEF DESCRIPTION OF THE DRAWINGS

FIG. 4 is a cross-sectional view taken along the line 4—4 of FIG. 2;

FIG. 5 is an end elevational view of one infra-red sensor device mounted on a support within an enclosure;

FIG. 6 is a side elevated view of the infra-red sensor device disclosed in FIG. 5;

DESCRIPTION OF THE PREFERRED EMBODIMENT

Figure 1:
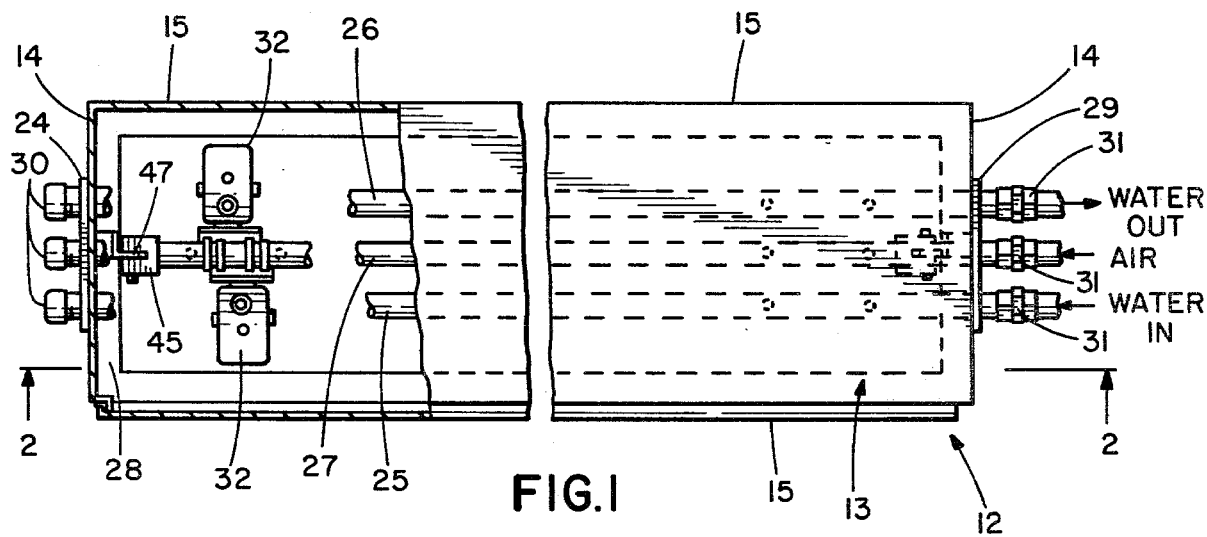
FIG. 1 is a plan view, partially in section of an enclosure containing infra-red sensor devices.

The Celada U.S. Pat. Nos. 3,467,368 and 3,900,247 respectively disclose a reactor and a process for producing sponge iron pellets from iron ore which is then utilized in a smelter apparatus for the production of steel. The present invention involves an apparatus for handling or transferring the pellets so produced. A movable conveyor 10 of conventional construction includes a belt 11 which is supported on conventional conveyor structure, driven by suitable motor means, neither of which is disclosed and being conventional in the art. The belt must be of a type highly resistant to high temperatures which are encountered in the handling of newly manufactured sponge iron. A sensor enclosure 12 is suitably supported above the belt 11 and includes a housing 13 having end walls 14 connected to side walls 15. A top wall 16 connects the end and side walls. A flange 17 is provided at the lower end of the enclosure 12 and is coextensive therewith defining an opening 19.

A box structure 20 is supported from channel structures 18 in turn supported on the flange 17. The structure 20 includes side walls 21 and end walls 22 connected thereto. The box structure 20 includes a lower opening 23. Back-up plates 24 are connected to the box structures 20 and channel structure 18 by means of fasteners 25.

Figure 2:
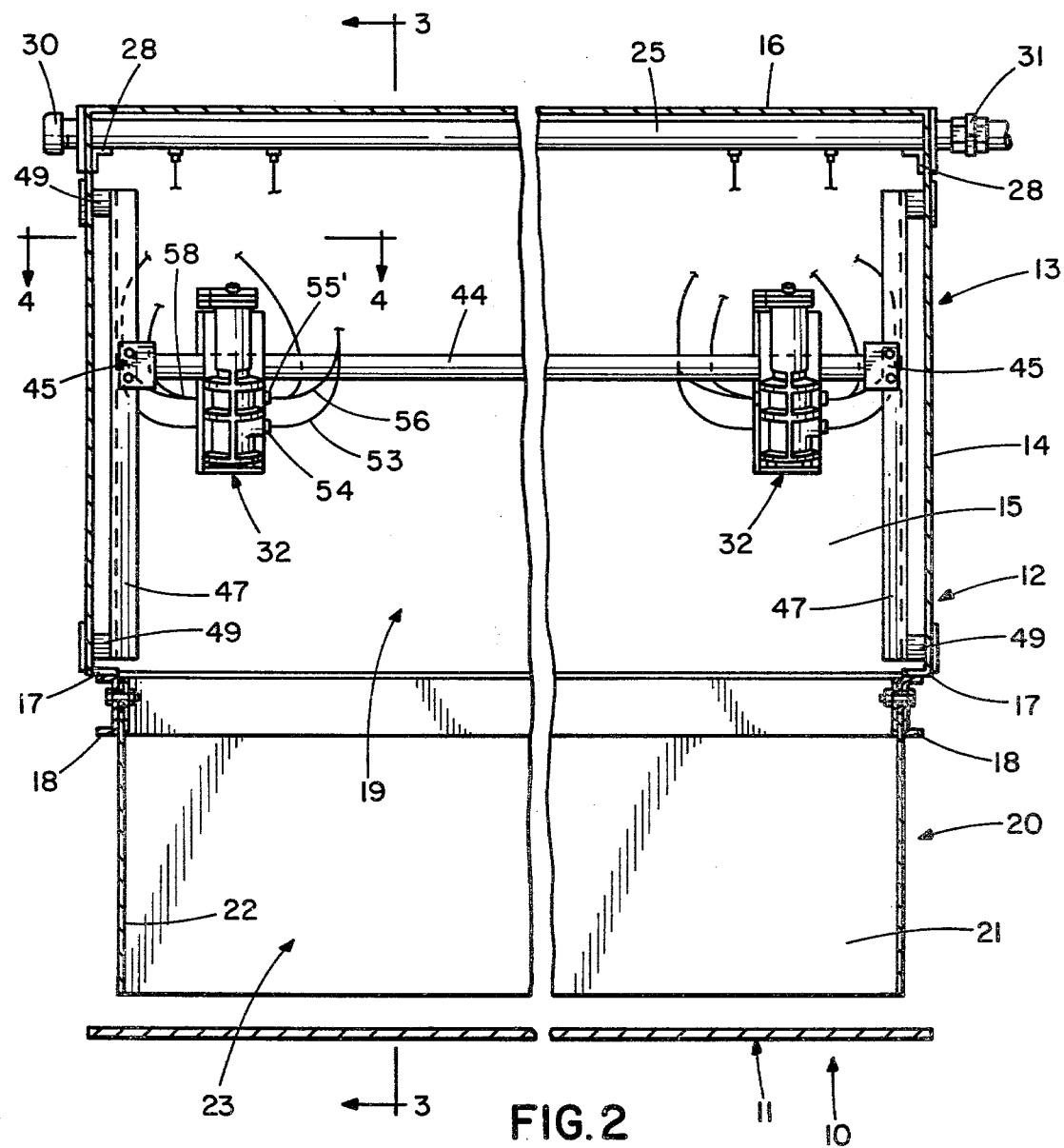
FIG. 2 is a cross-sectional view taken along the line 2—2 at FIG. 1.
Figure 3:
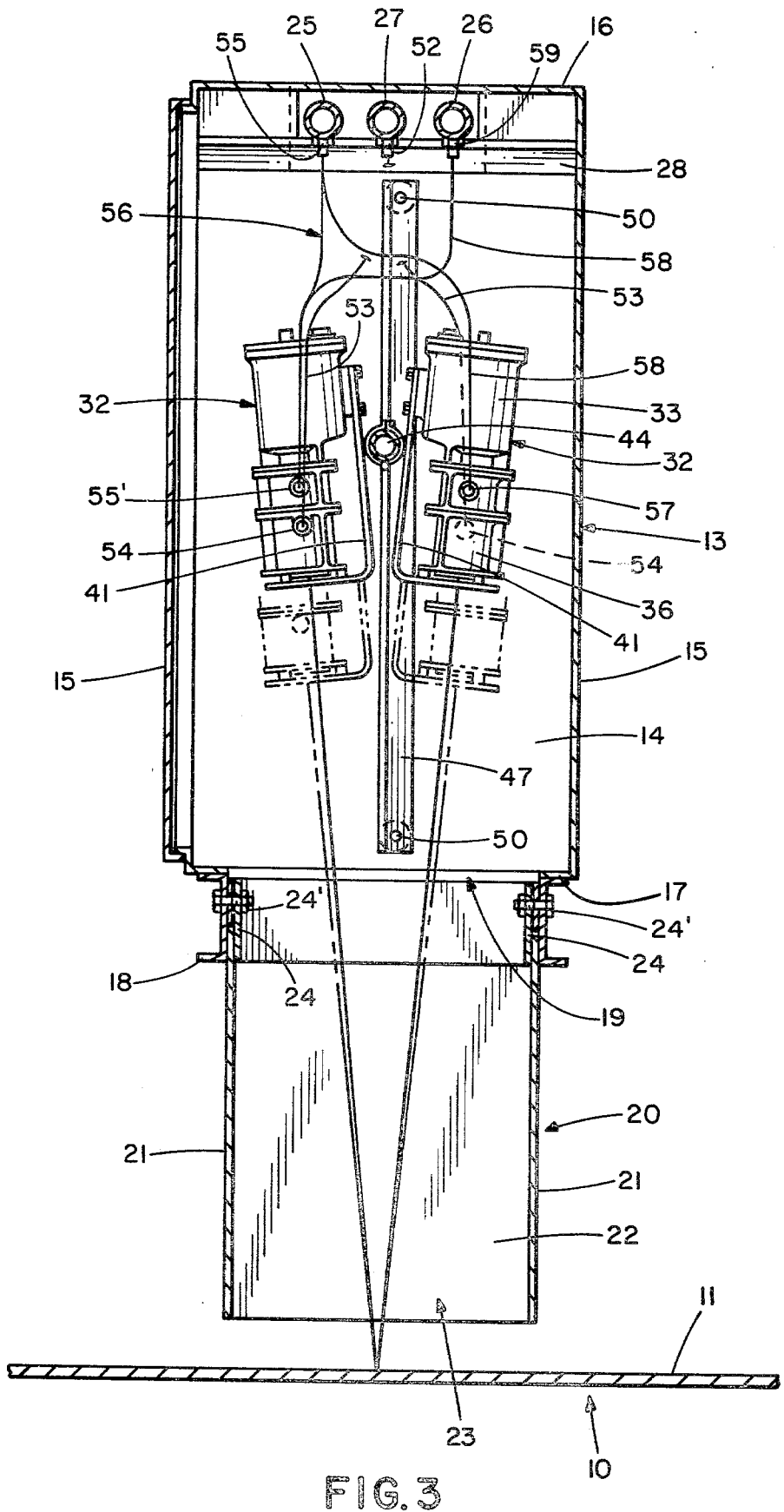
FIG. 3 is a cross-sectional view taken along the line of 3—3 of FIG. 2.
Figure 7:
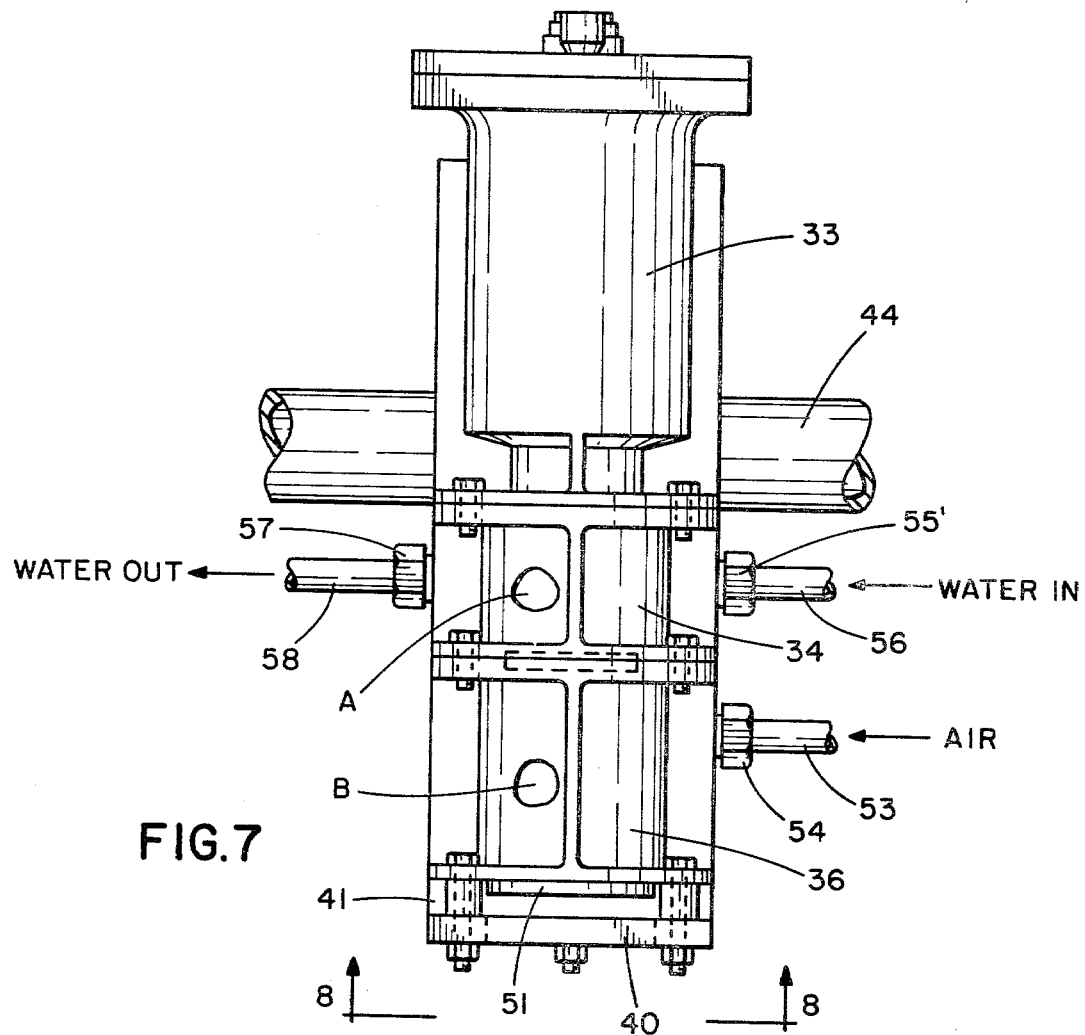
FIG. 7 is a side elevated view taken along the line 7—7 of FIG. 6.
Figure 8:
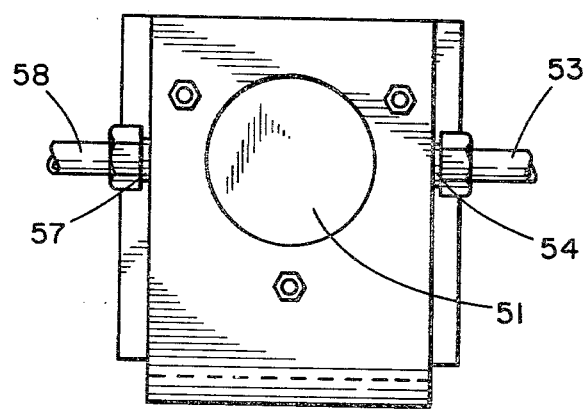
FIG. 8 is a view taken substantially along the line 8—8 of FIG. 7.

As best shown in FIGS. 1, 2 and 3, horizontal pipes 25, 26 and 27 are supported on angle supports 28 spaced from the upper end of the housing 13. The pipes 25, 26 and 27 are positioned by end brackets 29 through which they extend. The pipe 25 is the water inlet, pipe 26 is the water outlet and pipe 27 is the air pipe. The ends of the pipes are closed by caps 30. Suitable threaded connectors 31 are connected respectively to sources of water in, water out and air.

Referring now particularly, to FIGS. 4 through 8, an infra-red sensor device 32 is disclosed. The device 32 includes an upper housing part 33 and an intermediate housing part 34 secured together by cap screws 35. The device includes an infra-red sensor device and all the necessary components which, however, are conventional in the art and commercially available, the specific type forming no part of the present invention. Commercial devices are known as $E^2$ THERMODOT-Model TD-22 (not shown) available from $E^2$ Thermodot Incorporated Corporation located in Carpinteria, Calif. or the IRCON MOOLINE INFRA-RED OPTICAL SENSOR, SERIES 7000, available from Ircon Incorporated Corporation located in Skokie, Ill. The INFRA-RED SENSOR is of a type which will record temperature readings.

A lower housing part 36 is connected to the intermediate housing part 34 by means of cap screws 37. The lower housing part 36, by means of spacers 38 and 39 are secured to a horizontal plate 40 of a bracket 41. The bracket 41 is connected by means of cap screws 42 to the upper housing part 33. Split ring shock mounts 43 connect each of the sensor devices 32 to a horizontal pipe 44 which is provided at its opposite ends with sleeve members 45 having open end slots 46 which are engaged by the ends of flange members 47. The flange members are rigidly secured to the sleeve members 45 by means of screws 48. The flange members 47 are connected to spacer blocks 49 by means of screws 49' by screws 50. The above arrangement provides for vertical adjustment of the pipe 44 and infra-red sensor housings connected thereto.

The lower housing 36 includes a lower closure lens 51 which encloses the housing structure through which infra-red scanning can be accomplished. Each of the infra-red sensors 32 is provided with one air inlet and water inlet and outlet. The air pipe 27 includes air connections 52, which are in communication with air hoses 53, each in turn being connected to an air connection 54 on the lower housing part 36, as best shown in FIG. 3. Also, as best shown in this FIG. 3, the sensor devices 32 are reversed in that the brackets 41 are attached identically to each sensor device in the same manner. FIG. 2 AND FIG. 3 disclose that four infra-red sensor devices 32 are provided in the present enclosure though more can be added if desired. The pipe 25 includes a connector 55 which is in communication with a water-in hose 56 in turn connected by connector 55' on the sensor 32, the latter being provided on the intermediate housing portion 34. On the same side of the sensor, there is provided the air inlet connector 54.

A water outlet connector 57 on the opposite side of each sensor 32 communicates with a water out hose 58 in turn connected to a water out connector 59 on the pipe 26. The air hose provides for the cleansing of dust from the sensor and lenses whereas the water connection and hoses provided continuing coolant to the sensors for cooling them. The intermediate chamber A of the intermediate housing part 34 is sealed from the lower chamber B of the lower housing part 36 and is separated by a lens 51'. Water running through chamber A cools the infra-red sensors. Chamber B which is the air chamber is vented and the air blown into chamber B keeps the lens 51 and 51' clean.

Figure 9:
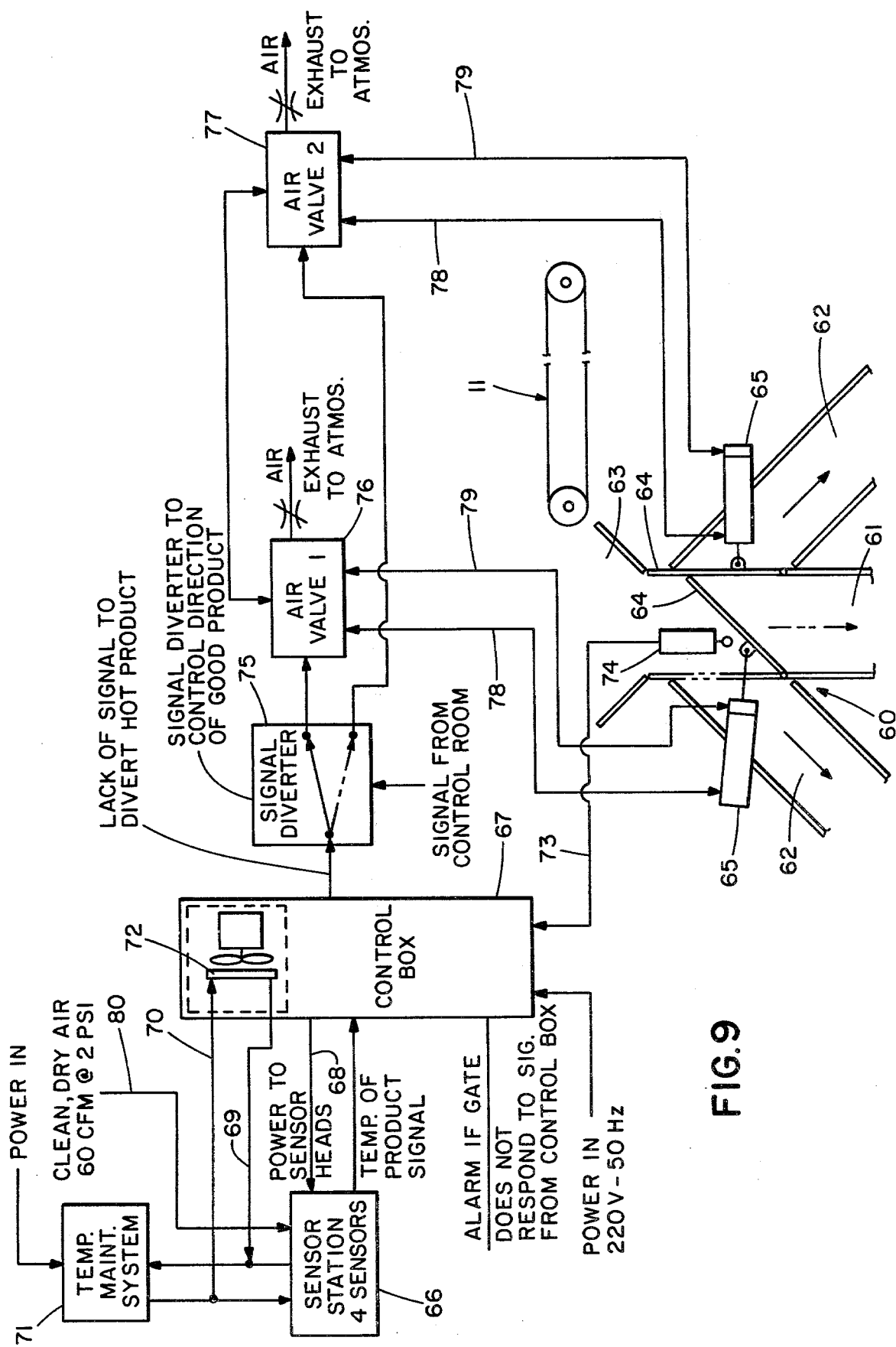
FIG. 9 is a schematic view of the infra-red sensor arrangement including relevant operating components of a heat monitoring and transfer system.

FIG. 9 is a schematic diagram disclosing generally the arrangement for transporting the sponge iron and for segregating the bad product from the good product. The conveyor belt 11 is shown in proximity to a chute structure 60 comprising a first vertical hot product chute 61 and diagonally extending chutes 62 which direct good product to its desired destination. A hopper 63 is adapted to receive the sponge iron from the conveyer belt 11.

Gates 64 are hingedly connected to the arrangement and by means of air cylinders or fluid extensible devices 65 (cylinder, piston and piston rod) are moved to different positions blocking and unblocking certain of the chutes.

The sensor station 66 essentially comprises the sensor enclosure which is not specifically detailed in FIG. 9 but which is disposed over the conveyor belt 11 at a suitable position. A control box 67 supplies power to the sensors through a power connection 68 from the control box. The water in hoses and connections, and the water out hoses and connections are exemplified by lines 69 and 70 which include a temperature maintenance system 71 recirculating water to cooling unit 72 located within the control box 67. The control box, by a lead 73 is connected to limit switches 74 indicating the position of the gates 64.

The control box 67 includes means to send a signal if hot product is detected on the conveyor by the infra-red sensors. The signal is transmitted to a signal diverter 75 which actuates air valves 76 and 77 to close the gates 64 whereupon the hot sponge iron is dumped into hopper 63 and is directed by vertical chute 61 to a particular location. As the good product is then scanned by the sensors, the gates are moved to their original position. As disclosed on the drawings, the gates are either in a closed position relative to both chutes 62, or one of the gates 64 is open whereupon the other gate 64 is closed. The valve directs air to and from opposite sides of the fluid extensible devices 65 by means of air conduits 78 and 79 in conventional fashion. The reference character 80, in FIG. 9, represents the continued air connections 53, 54 and 55 disclosed in the other figures.

The Operation

The infra-red sensors 32 are cooled by the water outlet and inlet connections as indicated and the air connections provide for the removal of dust from the optical parts of the sensor devices. The chamber A may be double walled in the intermediate housing with water flowing in and out in cooling the sensors. As the normal temperature product moves along the conveyor 11, the sensors, by means of the control box, may indicate the temperature on a suitable gauge but no signal to the signal diverter is transmitted. The gates are in the position indicated in FIG. 9 and the good product is dumped from the conveyor 11 into one of the chutes 62 to the desired station. However, as "hot product" sponge iron, at a predetermined temperature, is sensed by the sensors then the control box sends a signal to the signal diverter which causes air valve 76 or 77, depending on the position of the signal diverter, to function and close both of the gates 64 whereupon the hot product is channelled through chute 61 to a certain destination. After the hot product is dumped, the signal diverter in response to "good" product temperature, provides for the gates again to assume the position as indicated. The system is so set only one gate will be open at any time during which good product is being discharged and may be controlled so that either one or the other of chutes 62 is in operation.

During tests of the aforementioned arrangement, the sensors were capable of detecting hot spots in the sponge iron during conveyer speeds between 300–400 feet per minute. The height of the sensor above the conveyor was arranged about 4'8" with satisfactory results. In one particular test indicating a proper temperature of pellets, the temperatures were 157° F., 150° F., 145° F. and 135° F. Hot spots which were pellets overheating would indicate temperatures as high as 495° F. which of course would indicate bad product which would actuate operation of the system to segregate the same.

What is claimed is:

1. A heat monitoring and transfer arrangement particularly adapted for newly manufactured sponge iron pellets comprising:
conveying means adapted to move said sponge iron pellets from a direct reduction reactor unit, where said pellets were heated during manufacture, to another plant unit,
an enclosure positioned in close proximity to said conveying means,
infra-red sensor means supported within said enclosure,
support means for supporting said sensor means within said enclosure including a horizontally disposed support element and sensor bracket means for mounting said sensor means, said bracket means being attached to and selectively positionable relative to said support element for selective angular positioning of said sensor means relative to said support element, said support means further including vertically extending flange means mounted within said enclosure for supporting said support element, said support element being selectively positionable along said flange means whereby the vertical positioning of said sensor means within said enclosure may be selectively varied, said sensor means being adapted to sense the temperature of said sponge iron pellets moving with said conveying means, and means for segregating pellets above a predetermined temperature from the remaining pellets, said sensor means actuating said segregating means when detecting said pellets of a temperature higher than said predetermined temperature.

2. The invention in accordance with claim 1, said segregating means, including chutes associated with said conveyor means, and gate means associated with said chutes responsive to said sensor means.

3. The invention in accordance with claim 3, including fluid actuated elements for moving said gate means.

4. The invention in accordance with claim 3, including valve means connected to said fluid actuated elements and being responsive to a signal from said sensor means.

5. The invention in accordance with claim 4, said responsive means including signal diverting means adapted to receive a signal from said sensor for actuating said valve means to move said gate means and thereby segregating said pellets of a temperature higher than said predetermined temperature.

6. The invention in accordance with claim 1 including means for circulating a cooling medium to said sensor means.

7. The invention in accordance with claim 1 including means for directing air under pressure to said sensor means.

8. The invention in accordance with claim 1, said sensor means including a housing enclosing an infra-red sensor and said support means supporting at least one infra-red sensor housing within said enclosure, said enclosure having a lower open end adjacent and above said conveying means, and means for directing air under pressure and cooling fluids to said sensor housing including flexible hose means for accommodating the selective angular and vertical positioning of said sensor means.

9. The invention in accordance with claim 8 said segregating means including at least a plurality of chutes adapted to receive pellets from said conveyer, and gate means for said chutes to direct pellets of different temperatures to different chutes.

10. The invention in accordance with claim 9, including fluid actuated elements connected to said gate means, and valve means responsive to said sensor means for controlling movement of said gate means.

11. The invention in accordance with claim 1, said conveying means being resistant to elevated temperatures encountered in transporting of newly manufactured sponge iron pellets.

12. A method of monitoring the elevated temperature of newly manufactured sponge iron pellets and segregating pellets which have been heated during manufacture above a predetermined temperature comprising the following steps:

conveying the sponge iron pellets on conveying means from a direct reduction reactor unit where the pellets were heated during manufacture, to another plant unit, monitoring the temperature of the sponge iron pellets being conveyed by positioning infra-red sensor means in close proximity thereto, wherein the temperature elevation of the pellets is solely a result of the process of their manufacture, and segregating sponge iron pellets heated during manufacture above a predetermined temperature from the remaining pellets in response to a signal from the infra-red sensor means.

13. The method in accordance with claim 12, and housing the infra-red sensor means in a protective enclosure and supplying a cooling medium thereto.

14. The method in accordance with claim 12, wherein said conveying means are resistant to elevated temperature encountered in conveying the sponge iron pellets.

* * * * *